United States Patent
Herbert

Patent Number: 5,963,927
Date of Patent: Oct. 5, 1999

[54] MAILING SYSTEM

[75] Inventor: Raymond John Herbert, Leigh-on-Sea, United Kingdom

[73] Assignee: Neopost Limited, Essex, United Kingdom

[21] Appl. No.: 08/792,429

[22] Filed: Jan. 30, 1997

[30] Foreign Application Priority Data

Jan. 31, 1996 [GB] United Kingdom .................. 9601899

[51] Int. Cl.⁶ .................................................. G07B 17/00
[52] U.S. Cl. .......................... 705/401; 361/749; 705/410
[58] Field of Search .............................. 29/592; 340/531, 340/539, 825.54; 342/44; 361/749; 364/478.13, 478.14; 705/401, 410

[56] References Cited

U.S. PATENT DOCUMENTS

| | | | |
|---|---|---|---|
| 3,913,219 | 10/1975 | Lichtblau | 29/592 |
| 5,032,823 | 7/1991 | Bower et al. | 340/568 |
| 5,557,096 | 9/1996 | Watanabe et al. | 235/492 |
| 5,574,470 | 11/1996 | De Vall | 343/895 |
| 5,627,517 | 5/1997 | Theimer et al. | 340/572 |

FOREIGN PATENT DOCUMENTS

| | | |
|---|---|---|
| 0680012 | 11/1995 | European Pat. Off. . |
| 2275668 | 9/1994 | United Kingdom . |
| 93/19993 | 10/1993 | WIPO . |

*Primary Examiner*—Edward R. Cosimano
*Attorney, Agent, or Firm*—Shoemaker and Mattare, Ltd.

[57] ABSTRACT

A mail item is disclosed comprising a cover for carrying contents and formed of flexible electrically insulating material. The cover acts as a substrate on which semi-conductor elements and electrical connections are formed or deposited. The electronic circuit comprises semi-conductor elements interconnected to provide at least a memory and an interface to said memory and electrical connections are formed to be flexible. Mail handling apparatus is disclosed for communicating with the interface of the mail item and for writing information to and reading information from the memory via the interface.

8 Claims, 2 Drawing Sheets

MAILING SYSTEM

BACKGROUND OF THE INVENTION

This invention relates to a mailing system for conveying items from a sender to a recipient and in particular to the provision of means on the items to enable automatic handling of the items.

Generally when items are sent by mail, mailing information is applied to the exterior of the item. Such mailing information usually comprises a destination address and a postage stamp or a franking impression to indicate that a postage charge for the item has been paid and/or accounted for. In order to handle the mail and to check that the correct postage charge has been paid or accounted for, the postal authority or other carrier has to visually read the mailing information. The mail item needs to be correctly orientated to enable reading of the mailing information.

For special classes of mail, for example registered mail and recorded delivery mail, it is known to apply a bar code, identifying a specific mail item, to the item to enable tracking of the item to be effected during its carriage from the receiving office of the postal authority to the destination address.

SUMMARIES OF THE INVENTION

According to one aspect of the invention a mail item comprises a cover for carrying contents therein and formed of flexible electrically insulating material and an electronic circuit; said electronic circuit comprising semi-conductor elements interconnected to provide at least a memory and an interface to said memory; said cover of flexible electrically insulating material acting as a substrate on which the semi-conductor elements and electrical connections are formed or deposited and the semi-conductor elements and electrical connections being being flexible.

According to a second aspect of the invention a mailing machine for handling a mail item as hereinbefore defined includes a microprocessor, a memory and read/write means operable to communicate with the interface to read information from the memory means and to write information to the memory means; said microprocessor being operable to control said read/write means to write postage information via said interface means to said memory means.

BRIEF DESCRIPTION OF THE DRAWING

An embodiment of the invention will now be described by way of example with reference to the drawings in which.

DESCRIPTION OF THE PREFERRED EMBODIMENT

Figure 1:
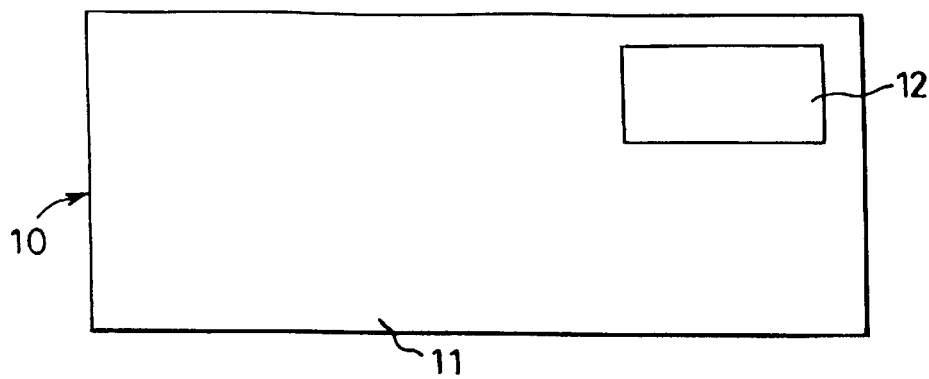
FIG. 1 shows a mail item.
Figure 5:
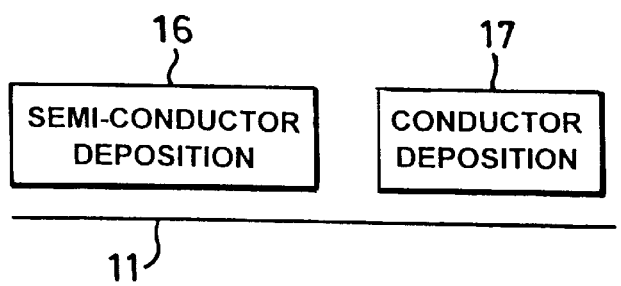

Referring first to FIG. 1, a mail item 10 comprises a re-usable envelope or outer cover 11 formed of a film of flexible electrically insulating material. Preferably the material is a polymer and for example may be polyester. An electronic circuit consisting of interconnected semi-conductor devices is formed on an area 12 of the cover 11. The electronic circuit comprises elements formed on or deposited on the material of the cover, the material of the cover acting as a substrate for the elements of the electronic circuit. Electrodes and conducting tracks to provide electrical interconnections between elements of the circuit are formed of electrically conducting graphite based polymer ink. The electrodes and conducting tracks may be formed by deposition of the ink by conventional printing techniques. Semi-conductor areas are formed of polymer, preferably of organic semi-conductor material and for example dihexyl-sexithiophene. This material may be deposited either by evaporation or sublimation FIG. 5 illustrates, diagrammatically, deposition of semi-conductor material on a cover 11 at a semi-conductor deposition station 16 and deposition of electrodes and conducting tracks at a conductor deposition station 17.

The material of the which the cover is formed is flexible and all of the materials of which the electronic circuit, including the interconnections and semi-conductor components of the circuit, are flexible. As a result the cover including the area 12 in which the electronic circuit is formed is flexible and can be passed through machinery for handling mail items without damage to the electronic circuit. A protective layer is formed over the area 12 in which the electronic circuit is formed to protect the electronic circuit from mechanical damage, the protective layer being of flexible material.

Figure 2:
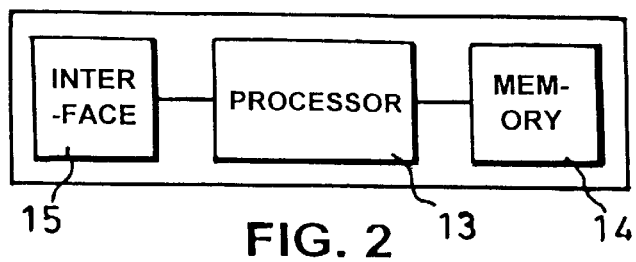
FIG. 2 is a block diagram of an electronic circuit formed on the mail item.

The electronic circuit is illustrated by the block diagram of FIG. 2 constitutes a so-called smart device including an electronic data processing circuit 13 and a memory 14 for storing data. The circuit also includes an interface 15 for communicating with other electronic apparatus for writing data to or reading data from the memory 14. The interface 15 may include electrical contacts. However it is preferred to use a contactless type of construction because there would then be no requirement, as there is with electrical contacts, of ensuring correct orientation of the mail item 10 relative to external apparatus to enable writing or reading data to and from the memory. Also the circuit would not need to be located at a precise location on the envelope 11 and the envelope could be of different shape and size.

The circuit device may carry in the memory 14 thereof, postal data relating to payment of a postage charge in respect of conveyance of the item 10 to a destination address. The postal data may relate to a prepayment system or a post-payment system for payment of the postage charge. In either system, the circuit stores an accounting record of postage charge and any other required accounting data in respect of conveying the item from a sender to a recipient one or more times. For example the accounting record may relate to sending of the item to a recipient and the return of the item by the recipient to the original sender.

Whereas in conventional mailing, the destination address is applied in visually human readable form to the exterior of a mail item, in the mail item of the present invention, the destination address may be stored in the memory 14 of the circuit and in addition routing information may be stored to enable automatic sorting and routing of the item by the postal authority or other carrier. The information stored in the memory of the circuit may include identity of a user, usually the sender, to be charged for conveyance of the item by the carrier. The information relating to the user may include the address of the user and a user identification number.

The information may be stored in the memory of the circuit and communication with the circuit may be effected in a secure manner. Messages to and from the device may be encrypted and the information may be stored in encrypted form. By use of encryption of the information, accounting data relating to postage charges for the mail item may be held secure from any attempts to tamper with the accounting data.

Figure 3:
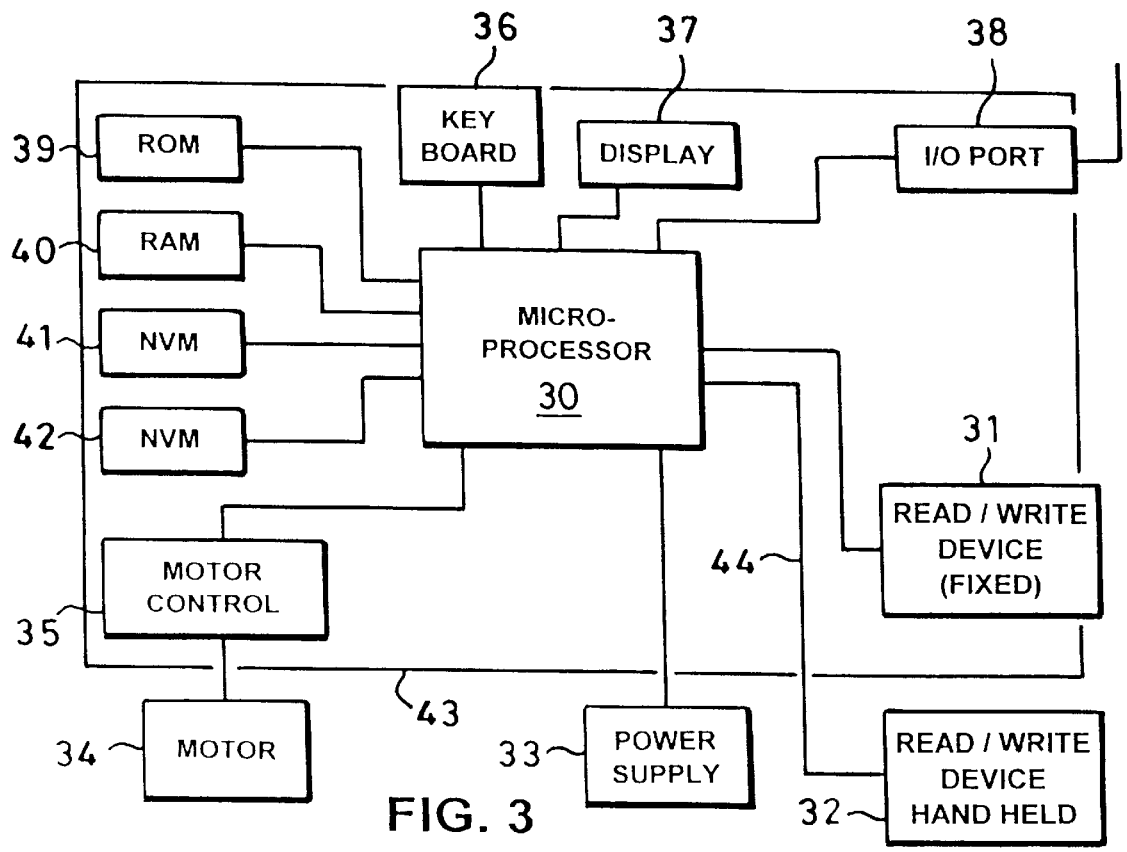
FIG. 3 is a block diagram of a mailing machine in accordance with the invention.

A user of mail items as described hereinbefore would use a mailing machine, a block diagram of which is shown in FIG. 3, to write information to the memory 14 of the circuit of a mail item to be sent. In many respects the mailing machine is similar to but may be more simple than a conventional postage meter. Referring to the block diagram of FIG. 3, the mailing machine includes a microprocessor 30 to perform accounting, communication and control functions of the machine. The mailing machine also includes a read/write head 31 for linking with the interface 15 of a circuit of a mail item to enable reading and writing of data from and to the memory 14. The head 31 is located in the mailing machine such that the areas 12 of mail items fed through the machine pass in proximity to the head when in transit through the machine whereby there is coupling between the head and the interface 15 of the circuit to enable reading and writing of data from and to the memory by the head. The head may be a fixed head 31 permanently located on the mailing machine or may be a hand held head 32 with a flexible electrical connection 44 to the machine to enable the head 32 to be removed and moved into proximity to the area 12 of an item which is not fed through the machine. The mailing machine is powered by a power supply 33.

The hand held head 32 may be provided as an alternative to or in addition to the fixed head 31. The heads 31, 32 may communicate with the interface 15 of the circuits of mail items either in a contact or contactless manner in dependence upon the type of interface 15 of the circuit. Of course mail items may be provided with contact or contactless interfaces and hence if desired the mailing machine may be provided with heads capable of communicating in both manners with the circuits whereby both types of mail item may be handled.

Transport of mail items through the mailing machine is effected by feeding means driven by a motor 34 controlled by a motor control circuit 35 operated and controlled by the microprocessor 30. In the event that failure of a circuit is detected, for example due to an incorrect response or absence of a response to interrogation by the microprocessor 30 via the head 31, or head 32, the microprocessor terminates operation of the feeding means and the mail item is rejected.

As is known in franking machines, a keyboard 36 and a display 37, connected to the microprocessor 30, are provided for operator control of the machine. In addition, a port 38 may be provided for remote communication with the mailing machine for the purpose of remote control of the operation or functioning of the machine. A read only memory (ROM) 39 stores program routines for controlling operation of the microprocessor 30 and a random access memory (RAM) 40 is provided as a working store for the microprocessor 30. Non-volatile memories (NVM) 41, 42 are provided for storing accounting data in the machine. Those parts of the mailing machine handling critical accounting data are housed in a sealed secure housing 43. However in the present system, accounting for postage charges may be accomplished at a receiving office of the postal authority where received mail items are passed through a reader to read data from the smart device. If accounting is carried out by the postal authority, there may be no requirement for security in the mailing machine and hence the sealed secure housing 43 is not required and may be dispensed with.

Security for the information handled by the mailing machine and the circuit of the mail items may be provided by use of suitable encryption algorithms to encrypt the information.

The mailing machine may be constructed as a hand held portable unit which is swiped across the area 12 of mail items such as to enable communication between the hand held unit and the circuit.

When the mailing machine is to be used with a prepayment postage charge system, the memories 41, 42 store a value of credit available to be used in applying postage charges to mail items. Credit transfer to the mailing machine may be effected by known methods of resetting credit in postage meters and for example may be effected by a remote resetting computer connected to the port 38. Alternatively a smart device arranged specifically for credit resetting may be located in communication with the read/write head 31 or 32 and credit funds may be transferred from the smart device to the memories 41, 42 of the mailing machine.

The circuit on the mail item may be utilized by the sender to store a message for transmission to the recipient of the mail item. The message may be maintained secure by encryption of the message by the sender. The message may be read by the recipient from the memory of the circuit and, after decryption of the message, the message may be printed out by a printer coupled to a mail reader. Encryption of the message may use a key determined by the sender or recipient and known to both parties.

The data processing and data storage facilities 13, 14 provided by the circuit may be used to handle relatively large volumes of data and, for example, the memory 14 may be used to store data relating to accounting, postal class, weight, senders and recipients addresses, the contents of the item e.g. value and class of goods. The data relating to contents of the item would be of use where customs checks of contents of items in transit to or from foreign countries are carried out. Furthermore, during handling of the item in the postal system, times and dates at which the item passes through predetermined points, for example sorting offices, may be entered into the smart device by equipment handling the items and a routing for the item through the postal system may be entered and stored. The memory of the circuit may store one or more algorithms for use in calculation of data, e.g. calculation of postal charge from the weight of the item.

It will be appreciated that the provision of the smart device on the mail item has the potential for storing a relatively large amount of data on each mail item as compared with conventional mail items. Conventional mail items bear a destination address written or typed in human readable characters which is not reliably capable of being read by machine. By providing the destination address in the memory of the circuit, the destination address is readable by machine and the handling and sorting of the mail item in the postal system in accordance with destination address of the mail item may be entirely automated.

The use of the circuit on mail items enables increased security, for example, in respect of postal charge accounting data in relation to mail items. Sensitive data may be stored in the memory in encrypted form and the data processing facilities of the circuit may be used to decrypt the data when an appropriate decryption key or algorithm is input to the processor 13 of the circuit. Also the memory 14 may store data relating to the identity of the mailing machine used to write data to the memory. Provision of the circuit permits calculations to take place on the mail item e.g. for calculating postal charge from weight information. Information may be stored in the memory to provide a unique identity to each item whereby tracking of items in the postal system may be accomplished.

Figure 4:
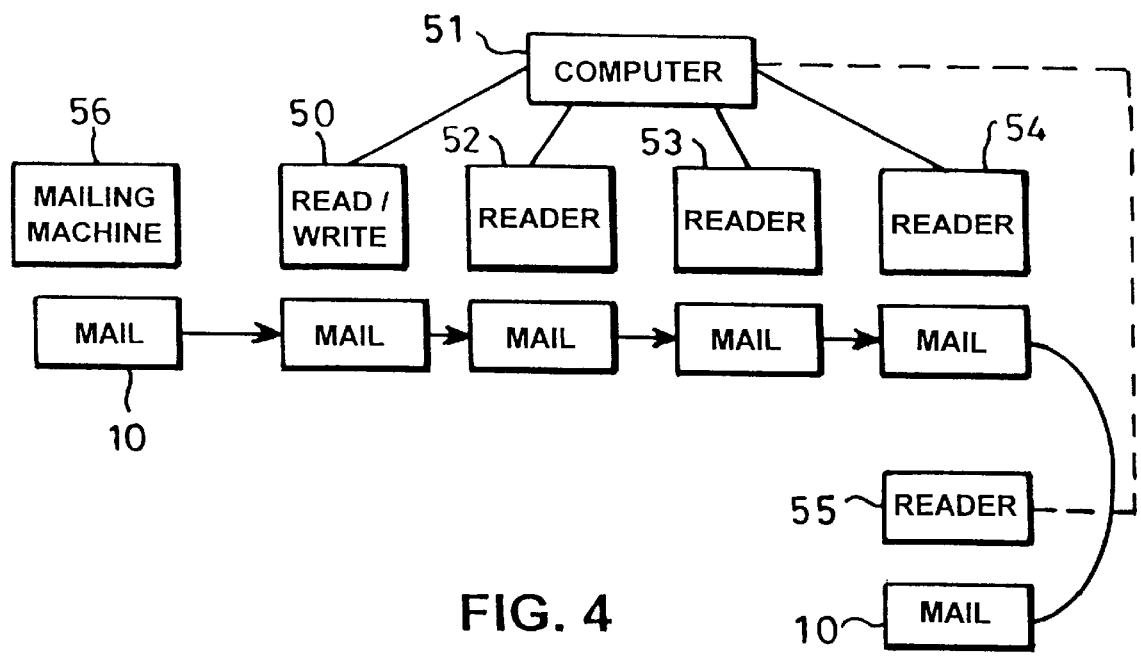
FIG. 4 is a block diagram of the mailing machine used in conjunction with postal authority mail handling equipment and FIG. 5 illustrates formation of the electronic circuit on the mail item.

It will be appreciated that by the provision of an electronic circuit which records information relating to destination and routing of the item and postage charge for conveying of the item, the item can be handled with a high degree of automation. As illustrated in the diagram of FIG. 4 when a mail item 10, including a circuit into the memory of which a mailing machine 56 has written data is received by a postal authority, the information recorded in the memory of the circuit is read out by a reader 50 linked to a mail handling computer 51. The computer would thus be enabled to verify that a postage charge for the mail item has been accounted for and to route the item with a preferred routing towards the destination address for that item. During subsequent handling and sorting of the item by the postal authority readers 52, 53, 54 at other locations, and also linked to the computer 51, read information from the memory of the circuit which is input to the computer to enable the computer to track passage of the item to its destination address. If desired a portable read/write unit 55 may be used by a postman, at the time of delivering the item to the recipient, to log delivery of the item. On return to the delivery office of the postal authority, the portable read/write unit is linked to the computer to transmit the log of deliveries to the computer. It is envisaged that the portable read/write unit would be used in relation to special delivery items, for example recorded delivery and registered mail items. When the delivery is in respect of an order placed with a supplier by a customer, the customer may be provided with a number, or other order identification, at the time of placing the order or when the order is acknowledged. Upon delivery of the item to a recipient the order identification is entered into the portable read/write unit for verification that the delivery of the item has been made to the correct recipient.

I claim:

1. A mail item including an envelope; said envelope being formed of a substrate of flexible electrically insulating material; an electronic circuit; said electronic circuit comprising at least first and second semi-conductor elements and conductive tracks interconnecting said first and second semi-conductor elements; said semi-conductor elements and said conductive tracks being deposited on said substrate of flexible electrically insulating material; said semi-conductor elements and said conductive tracks being flexible to enable flexing of the mail item; said electronic circuit including at least a memory for storage of postal information relating to the mail item and an interface for external communication with said memory.

2. A mail item as claimed in claim 1 wherein the flexible electrically insulating material comprises a polymer.

3. A mail item as claimed in claim 1 wherein the flexible electrically insulating material comprises polyester.

4. A mail item as claimed in claim 1 wherein the semi-conductor elements comprise polymer semi-conductor material deposited on the substrate of flexible electrically insulating material.

5. A mail item as claimed in claim 1 wherein the electronic circuit includes data processing means connected by the conductive tracks to the memory and to the interface.

6. A mail item as claimed in claim 1 wherein the interface provides contactless external communication with the electronic circuit.

7. An article for use as a mail item including a flexible cover; said flexible cover being formed of a substrate of flexible electrically insulating material; an electronic circuit; said electronic circuit comprising at least first and second semi-conductor elements and conductive tracks interconnecting said first and second semi-conductor elements; said semi-conductor elements and said conductive tracks being deposited on said substrate of flexible electrically insulating material; said semi-conductor elements and said conductive tracks being flexible to enable flexing of the mail item; said electronic circuit including at least a memory for storage of postal information relating to the mail item and an interface for external communication with said memory.

8. A mail item including an envelope; said envelope being formed of a substrate of flexible electrically insulating material; an electronic circuit; said electronic circuit comprising at least first and second semi-conductor elements and conductive tracks interconnecting said first and second semi-conductor elements; said semi-conductor elements comprising flexible semi-conductor material deposited on said substrate of flexible electrically conductive material and said conductive tracks comprising flexible electrically conductive material deposited on said substrate of flexible electrically insulating material; said electronic circuit including at least a memory for storage of postal information relating to the mail item and an interface for external communication with said memory.

* * * * *